(12) United States Patent
Ivarsson et al.

(10) Patent No.: US 10,486,461 B1
(45) Date of Patent: Nov. 26, 2019

(54) WHEEL LOCK WITH CENTRAL EXPANDER

(71) Applicant: Rimgard Sweden AB (publ.), Solna (SE)

(72) Inventors: Lars Ivarsson, Vaxholm (SE); Carl Pettersson, Solna (SE)

(73) Assignee: Rimgard Sweden AB (publ.), Solna (SE)

(*) Notice: Subject to any disclaimer, the term of this patent is extended or adjusted under 35 U.S.C. 154(b) by 0 days.

(21) Appl. No.: 15/997,718

(22) Filed: Jun. 5, 2018

(51) Int. Cl.
| | |
|---|---|
| *B60B 7/16* | (2006.01) |
| *E05B 77/44* | (2014.01) |
| *B60R 25/01* | (2013.01) |
| *E05B 81/06* | (2014.01) |
| *B60R 25/09* | (2013.01) |

(52) U.S. Cl.
CPC .............. *B60B 7/16* (2013.01); *B60R 25/01* (2013.01); *B60R 25/09* (2013.01); *E05B 77/44* (2013.01); *E05B 81/06* (2013.01)

(58) Field of Classification Search
CPC .......... E05B 73/00; E05B 77/44; E05B 81/00; E05B 81/02; E05B 81/04; E05B 81/06; B60R 25/00; B60R 25/09; B60R 25/093
See application file for complete search history.

(56) References Cited

U.S. PATENT DOCUMENTS

| | | | | |
|---|---|---|---|---|
| 2,012,735 A | * | 8/1935 | Swartz | B60B 7/16 70/116 |
| 2,124,035 A | * | 7/1938 | Hurd | B60B 23/06 292/6 |
| 2,217,775 A | * | 10/1940 | Smith | B60B 7/16 301/108.1 |
| 2,363,567 A | * | 11/1944 | Blakeman | E05B 65/006 292/6 |
| 2,568,370 A | | 9/1951 | Scuderi | |
| 2,807,157 A | * | 9/1957 | McLin | B60B 7/16 292/25 |
| 3,995,461 A | | 12/1976 | Hudson | |
| 4,825,669 A | * | 5/1989 | Herrera | B60B 7/16 70/163 |

(Continued)

FOREIGN PATENT DOCUMENTS

| | | |
|---|---|---|
| EP | 0119624 A2 | 9/1984 |
| GB | 2046185 A | 11/1980 |
| WO | 2017/078605 A1 | 5/2017 |

OTHER PUBLICATIONS

European Patent Office, International Search Report of PCT/EP2018/064731, dated Feb. 14, 2019, 4 pp.

*Primary Examiner* — Christopher J Boswell
(74) *Attorney, Agent, or Firm* — Berggren LLP (57) ABSTRACT

A device for locking a wheel of a vehicle is disclosed, comprising a main module, a center bolt, an expander and a locking mechanism. The main module comprises a plurality of elements configured to cover nuts or bolts of the wheel. The center bolt is adapted to be connected to the main module by means of a threading such that the axial position of the center bolt, as seen along the axis of rotation of the wheel, can be adjusted by rotating the center bolt relative the main module, and such that the expander expands in a radial direction of the wheel as the axial position of the center bolt is adjusted. The expander is thereby allowed to engage with the wheel to secure the device to said wheel.

12 Claims, 12 Drawing Sheets

(56) References Cited

U.S. PATENT DOCUMENTS

| | | |
|---|---|---|
| 5,410,897 A | 5/1995 | Edmondson |
| 6,419,326 B1 | 7/2002 | Rains |
| 8,733,140 B2 | 5/2014 | Jones |
| 8,739,585 B2 | 6/2014 | Sims |
| 8,943,865 B1 | 2/2015 | Bullock et al. |
| 9,120,446 B2 * | 9/2015 | Thomas .................. B60R 25/00 |
| 9,689,180 B2 | 6/2017 | Ivarsson |
| 2004/0112101 A1 | 6/2004 | Labuschagne |
| 2008/0127691 A1 | 6/2008 | Castillo |
| 2014/0077582 A1 | 3/2014 | Sims |
| 2014/0157841 A1 | 6/2014 | Thomas |
| 2015/0143859 A1 | 5/2015 | Beck, Jr. |
| 2015/0251488 A1 | 9/2015 | Hoff |
| 2018/0065408 A1 | 3/2018 | Wang |

* cited by examiner

WHEEL LOCK WITH CENTRAL EXPANDER

TECHNICAL FIELD

This invention relates to a technology for preventing unauthorized removal of car wheels. More specifically, a universal comprehensive locking system for car wheels is disclosed.

BACKGROUND

Unauthorized removal of car parts, specifically alloy wheels, is a frequently occurring problem all over the world. Due to their high value, custom wheels and tire rims are examples of items frequently stolen. Accordingly, there is a great need for devices and techniques for protecting wheels from unauthorized removal.

There have been attempts to provide such protection. For example, U.S. Pat. Nos. 8,739,585 and 8,943,865 disclose antitheft devices for car wheels. These devices can be removed relatively easily by an experienced thief and thus do not provide a truly reliable wheel lock. U.S. Pat. No. 9,689,180 issued to the inventor of this application provides a device that provides secure wheel lock. However, the device has a multitude of parts and needs to be modified to fit to various car wheels. Considering the great variety of car makes and models all over the world, there is a need for an improved wheel lock system that fits, without substantial adjustments, to most car wheels.

SUMMARY

It is an object of this invention to provide a universal locking system fitting to majority of car wheels to prevent unauthorized removal of the wheels.

Hence, according to a first aspect, a device for locking a wheel of a vehicle is provided. The device comprises a main module, a center bolt, an expander and a locking mechanism. The main module comprises a plurality of elements configured to cover the nuts or bolts by which the wheel is attached to the vehicle. The center bolt is adapted to be connected to the main module by means of a threading such that the axial position of the center bolt (as seen along the axis of rotation of the wheel) can be adjusted by rotating the center bolt relative the main module. This axial movement of the center bolt causes the expander, which is adapted to be operably connected to the center bolt, to expand in a radial direction of the wheel to engage with the wheel and thereby secure the device to the wheel. Finally, the locking mechanism is adapted to be arranged in a locking state in which the locking mechanism prevents the center bolt from rotating relative the main module, and in an open state in which the locking mechanism allows the center bolt to rotate relative the main module.

The plurality of elements adapted to cover the nuts or bolts of the wheel may be understood as protective cases or blocking means adapted to restrict, limit or block access to the bolt heads and/or lug nuts, thereby hindering or at least making it harder for an unauthorized person to undo the bolts/lug nuts and remove the wheel. The protective elements may form an integral part of the main module, or be attached as separate items to the same, and may preferably be arranged in a pattern corresponding to the position of the bolts/nuts of the wheel.

The center bolt may be threaded directly in the material of the main module, or indirectly via a socket or spacer that is fixated in the main module. In case a socket is used, the socket may be formed of a material having a higher stability and mechanical strength than the material of the remaining parts of the main module. The threading may be oriented such that the center bolt, upon rotation in the threading, moves along the axis of rotation of the wheel. The rotation may for example be achieved by means of a key or a wrench fitting with the center bolt.

The expander is arranged to secure the device to the wheel. This may for example be achieved by a mechanical means that is operated by the axial movement of the center bolt to engage with the wheel. The mechanical means may for example be configured to expand in the radial direction of the wheel upon rotation of the center bolt, resulting in an interference fit or press fit between the expander and the wheel. Thus, the device may be securely fixed to the wheel by tightening the center bolt.

When the device has been installed and secured to the wheel, for example by tightening the center bolt as described above, the locking mechanism may be brought into its locking state to prevent an unauthorized entity from removing the locking device and thereby accessing the nuts/bolts of the wheel. The locking mechanism may be configured to prevent the center bolt from being turned or rotated in the main module. This may be achieved in a number of ways, some of which being discussed in further detail in connection with the detailed description of the drawings. In one example, the locking mechanism may comprise a bolt that can be fixed to the center bolt and to the main module to prevent rotational movement between the two. The bolt of the locking mechanism may for example have a flat side that engages with a corresponding surface in the center bolt and the main module to keep the bolt from rotating. The locking mechanism may, in the locking state, be axially secured to the wheel by means of a washer configured to engage with a backside of the main module. To bring the locking mechanism in the open state, the washer may be rotated such that it can be released from its engagement with the main module and the bolt removed from the center bolt. Alternatively, or additionally the locking mechanism may comprise a locking pin or ball that can be moved in the radial direction and engage with the center bolt to prevent it from rotating and to the secure the locking mechanism to the device in the axial direction. To release the locking mechanism, the locking pin or the locking ball can be retracted.

The locking mechanism may in some examples be a key operated lock, such as e.g. the Assa Desmo+ camlock.

According to an embodiment, the expander may comprise a plurality of segments, wherein each of the segments is movable in the radial direction so as to engage the device to the wheel. In one example, each segment may comprise a tapered surface configured to slide on a corresponding tapered or cone shaped surface of the center bolt as the center bolt moves in the axial direction. Thus, the tapered surfaces of the center bolt and the segment may cooperate to transform an axial movement of the center bolt into a radial movement of the segment. In this way, the expander is allowed to be radially press fitted to the rim or wheel when upon tightening of the center bolt. The segments may in some examples form part of a circular washer arranged around the center bolt.

According to an embodiment, the expander comprises a material configured to be compressed elastically in the axial direction and to expand elastically in the radial direction as the axial position of the center bolt is adjusted. The expander may, according to this embodiment, for example be a washer or plate arranged to be compressed between an end portion of the center bolt and the backside of the main module (i.e., the side of the module facing the wheel when mounted) as the center bolt is rotated. By compressing the expander in this manner, it may at the same time be caused to expand laterally or radially and thereby be press fitted to the rim or wheel. Examples of elastic material may include a polymeric material such as e.g. rubber.

According to an embodiment, the expander may comprise a retaining means configured to pull the segments towards a center of the expander. The retaining means may for example be formed as a rubber band encircling the periphery of the annular segments for pushing them together and prevent them from falling apart when the device is removed from the wheel. The periphery of the segments may be provided with a groove for accommodating the retaining means. The groove may be arranged in the contact surface that engages the wheel, so as to protect the retaining means from being damaged by the press fitting.

It will be appreciated that the expander may cooperate with the axial movement of the center bolt so as to fasten the device to the wheel by means of a force acting in the axial direction, the radial direction or a combination of both. The radial engagement may be achieved by a radial expansion of the expander as described above, whereas the axial engagement may be achieved by allowing the expander to engage a shoulder of the wheel. In the latter case, the expander may be inserted behind the shoulder and expanded radially such that is prevented from being retracted.

According to an embodiment, the locking mechanism may comprise an axial recess, or lock-hole, formed in the center bolt, a detachable socket having a through hole and being adapted to be rotationally secured to the main module, and a detachable locking bolt, or lock, adapted to be inserted into the main module via the through hole and the axial recess. The axial recess and the through hole may be configured to be aligned with each other, and the locking bolt may be adapted to prevent the center bolt from rotating relative the socket.

According to an embodiment, the detachable socket may comprise recesses and protrusions, also referred to as teeth and flat areas, configured to engage with corresponding recesses and protrusions, also referred to as a 'specific pattern', of the main module. This allows for the socket to be both detachable (i.e., dismounted in the axial direction) and rotationally secured to the main module.

According to an embodiment, the device may further comprise a locking socket adapted to be rotationally secured to the main module, wherein the locking socket comprises an inner threading adapted to receive a locking bolt, and recesses and protrusions forming a pattern configured to engage with a corresponding pattern of recesses and protrusions of the detachable socket. The locking socket may be used together with the locking bolt to prevent the center bolt from rotating.

According to an embodiment, the locking bolt may be configured to be inserted via a front side of the device (facing away from the wheel) and to be secured in the axial direction by engaging a back side of the device (facing the wheel).

BRIEF DESCRIPTION OF DRAWINGS

The above, as well as additional objects, features and advantages of the present invention, will be better understood through the following illustrative and non-limiting detailed description, with reference to the appended drawings. In the drawings, like reference numerals will be used for like elements unless stated otherwise.

FIG. 1 A-E shows the main module (also called locking component) 1 of a locking device according to an embodiment.

The main module 1 may comprise an opening 15 arranged in its center to house a center bolt 3 (shown in FIG. 3) and a threaded socket 5 (shown in FIG. 5). The opening 15 of the main module has a socket with a pattern 14 on its inner circumference that matches the pattern 51 of an upper rim of the threaded socket 5 (shown in FIG. 5).

The main module 1 may comprise a multitude of radially extending elements 12 to cover lug nut heads of bolts attaching the car wheel. The main module 1 has a center part 16 comprising an edge or corner 13 adjusted to fit different rims with center hole diameter of different sizes. The corner 13 may rest directly on the rim or there may be spacers between the rim and the corner. The corner 13 may also have an extension (not shown in the present figure) to fit different rims. The main module 1 also has a space 10 which is adjusted to each different hub caps and a ridge 11 to secure the hub caps on place.

FIGS. 2A-C shows the locking cap, or locking socket. FIG. 2A is a cross sectional view and FIG. 2B is a top view. FIG. 2C is a perspective view. The locking cap 2 has a cylindrical part 23 and a circular part 21 that has a hole 22 having same size and shape as an inner part of a lock (shown in FIG. 6). The outer rim of the circular part 21 has a toothed pattern comprising of multitude of protrusions and recesses, such as for example extending teeth 21a and flat areas 21b in between the teeth.

FIGS. 3A-C shows the center bolt 3 according to an embodiment.

The center bolt 3 has a threaded outside 32 and a hole 31 or recess in the shape of a lock, so as to allow a lock to be inserted into the hole. The threaded outside 32 is to be threadedly attached to the threaded socket 5 (shown in FIG. 5) by screwing (i.e. the threaded outside 32 of the center bolt matches with the threads of the threaded socket). The center bolt 3 has a lateral circular extension 32a that has sloped edges 34 to have contact with the surface 43 of the expander 4 (FIG. 4).

FIGS. 4A-C shows an example of the expanders. FIG. 4C is a perspective view. Four expander sections 4 in this embodiment form a full expander that is circle shaped. The number of expander sections can vary from 1 (full circle) to any feasible number. The expander may be made of rubber, metal or other materials. The expander sections have a ridge 41 that is fitted behind a ridge inside the rim. However, in some cases, depending on the shape of the inside of the rim, the sections may not have the ridge. The expander sections have a flat top area 42 that is configured to slide on center part area 16 (shown in FIG. 1). The inside circumference 43 is configured to be toward the center bolt 3 (shown in FIG. 3). The expander sections may be held together by means of a retaining or attachment means (44a in FIG. 8) (a rubber band, wire or such) so as to form a full circle expander. Area 44 may be configured to hold the attachment means. The surface 43 of the expander may be brought in contact with the surface 34 of the center bolt 3. Due to the slope of the surface 34, screwing the center bolt inwards (toward the wheel) may cause the expander segments to move radially. In case of an expander formed of an elastic material, the movement of the center bolt may cause the expander to expand in the radial direction.

FIGS. 5A-C show the "threaded socket" 5 according to an embodiment. FIG. 5C is a perspective view. The threaded socket has a cylindrical part with threaded inside 53. The threaded inside matches with the threaded outside 32 of the center bolt 3 shown in FIG. 3. The threaded socket 5 has an upper rim with an external pattern 51. The pattern 52 matches with the pattern 14 of the socket of the main module (shown in FIG. 1). The threaded socket has grooves 52 in its inside to match the pattern 21 of the locking cap 2 shown in FIG. 2.

FIGS. 7-8 are cross sectional views of embodiments of the device when mounted. The figures show the main module 1, the locking cap 2, the center bolt 3, the lateral circular extension of the center bolt 32*a*, the sloped edge of the lateral extension 34, the expander 4, the sloped edge of the inner circumference of the expander 43, the retaining or attachment means 44*a*, the ridge 41 of the outer circumference of the expander, the threaded socket 5, and the lock 6.

DETAILED DESCRIPTION

According to a preferred embodiment, the locking device of this invention comprises a locking component (main module) 1, a locking mechanism 2, 5, 6, a center bolt 3, and an expander cooperating with the center bolt 3.

As illustrated in for example FIGS. 1A-F, the main module may comprise a center part 16 and a multitude of radially extending elements 12 configured to cover lug nuts or bolts attaching the car wheel. Further, the main module 1 may comprise an opening 15 with a configured to house the center bolt 3. The center bolt 3 may be threaded in the opening, either directly in the material of the main module 1 or indirectly via for example a threaded socket 5. In the particular example illustrated in for example FIGS. 1-7, the center bolt is connected to the main module via a threaded socket 5 that is mounted in the main module by means of recesses and protrusions 51 forming matching patterns on the outer side of the threaded socket 5 and in the main module 1.

The center bolt 3 may be threaded into the threading 53 of the threaded socket 5 and locked by means of a locking socket or locking cap 2. Such a locking socket 2 is disclosed in FIGS. 2A-C. The locking socket 2 may comprise protrusions 21*a* and recesses 21*b* matching a corresponding structure 52 in the threaded socket 5 illustrated in FIG. 5A-C. Thus the main module 1, the locking socket 2, and the center bolt 3 as shown in FIGS. 1-8 can be assembled together by using the matching specific patterns and the threads.

Figure 1A:
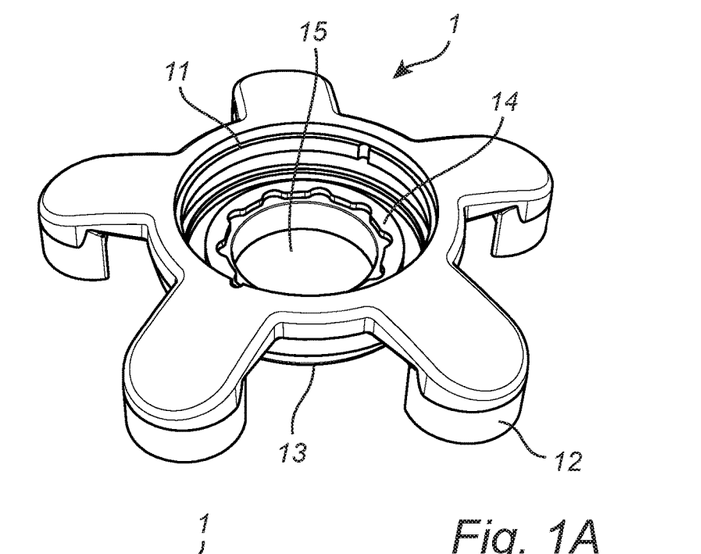
FIG. 1A is a perspective view.
Figures 1B, 1C:
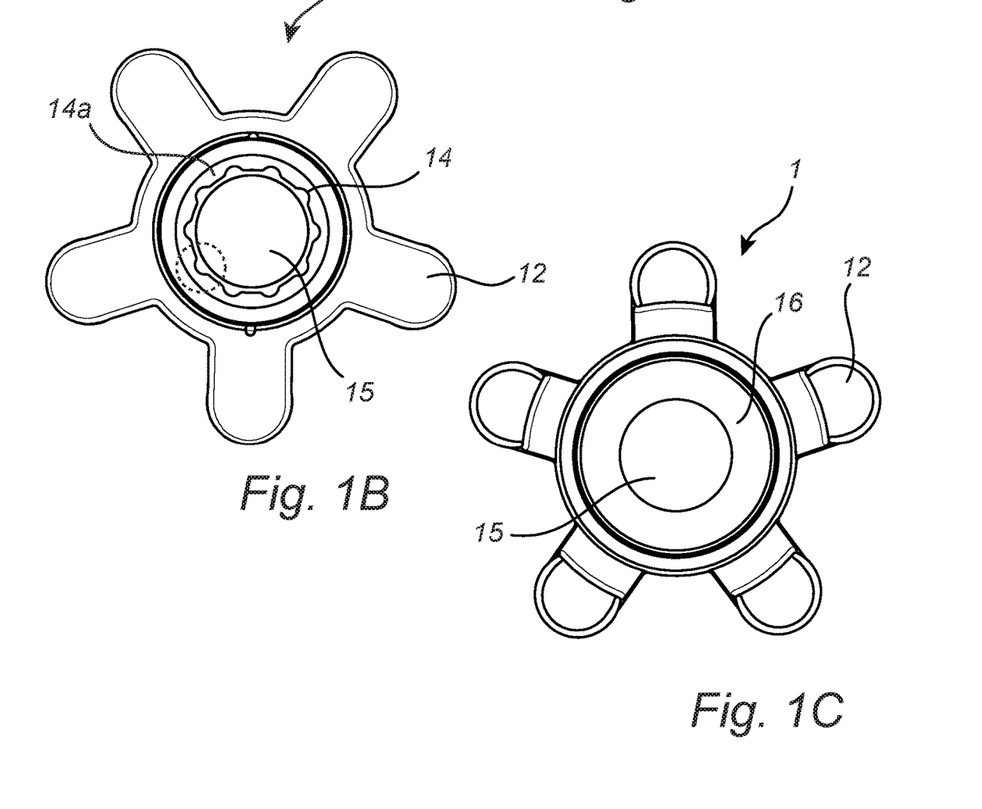
FIG. 1B is a top view.
FIG. 1C is a bottom view.
Figure 1D:
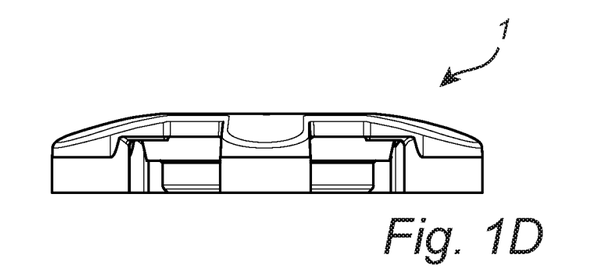
FIG. 1D is a side view.
Figure 1E:
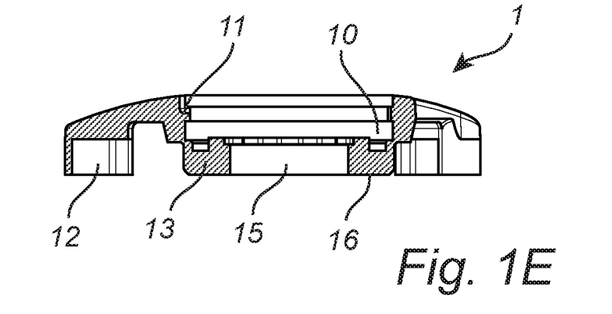
FIG. 1E is a cross sectional view.
Figure 1F:
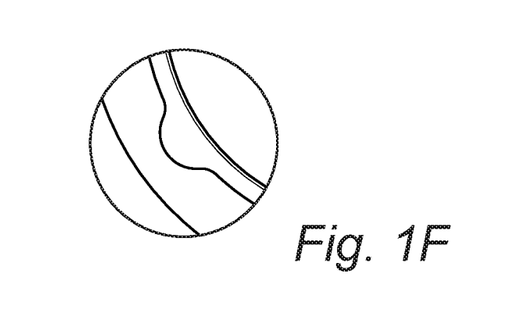
FIG. 1F is a detail from FIG. 1B.
Figure 2A:
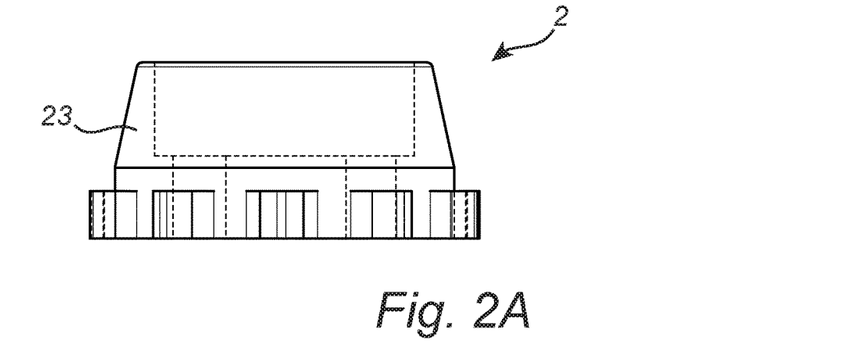
Figures 2B, 2C:
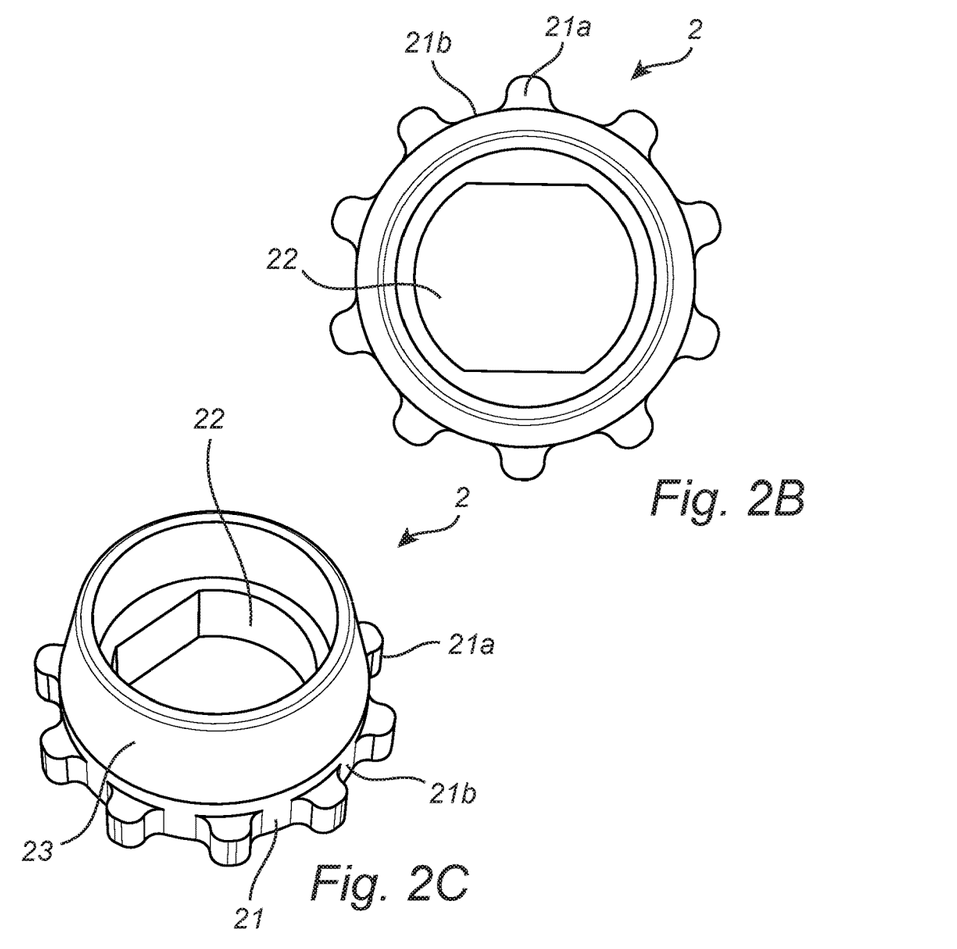
Figure 3A:
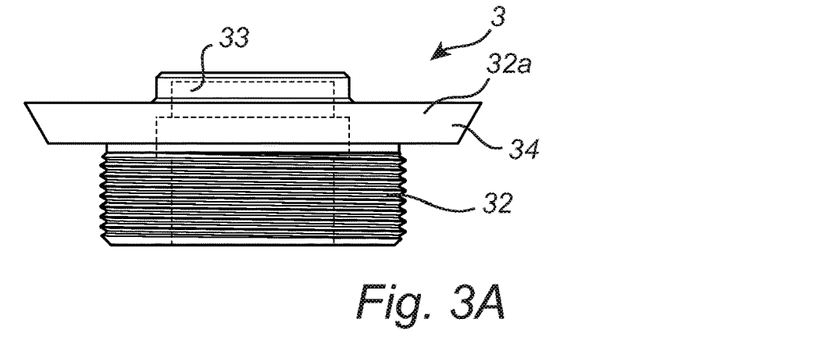
FIG. 3A is a side view.
Figure 3B:
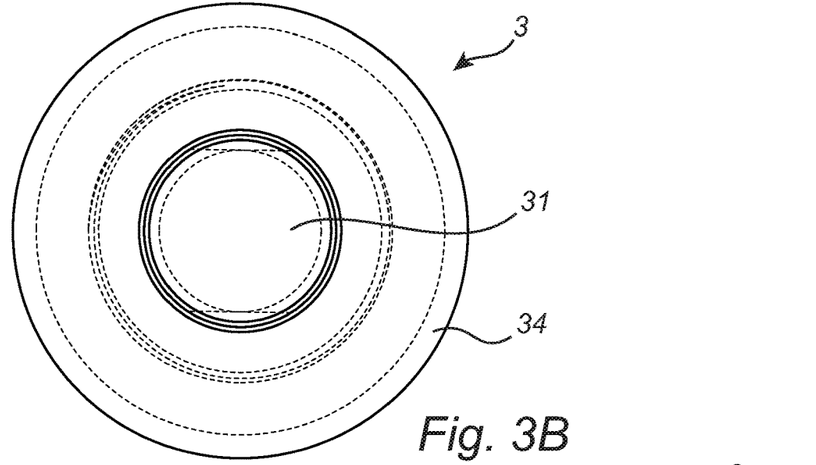
FIG. 3B is a top view.
Figure 3C:
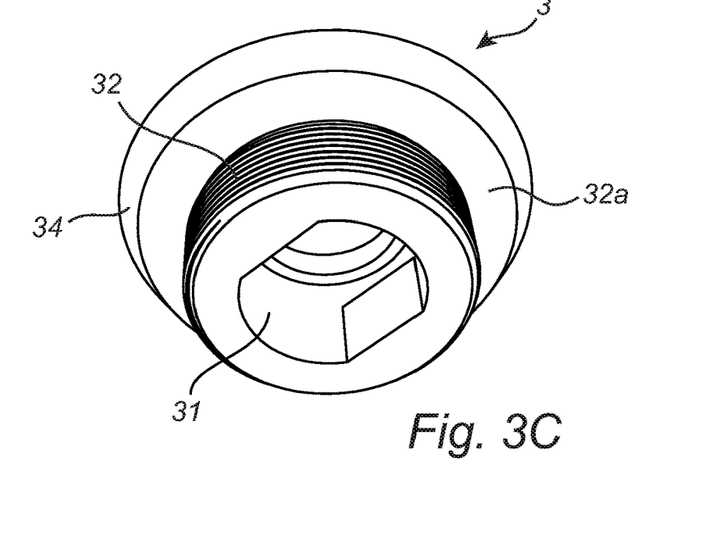
FIG. 3C is a perspective view.
Figure 4A:
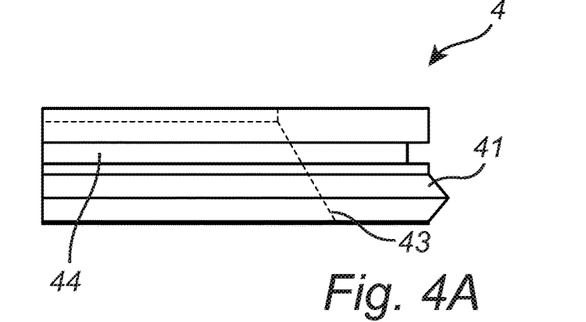
FIG. 4A is a side view.
Figure 4B:
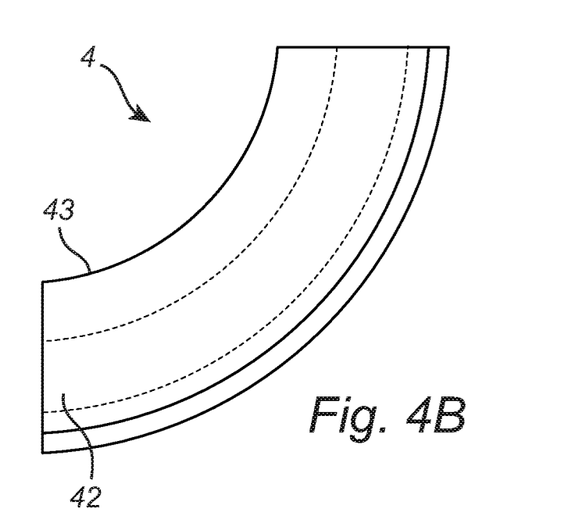
FIG. 4B is a top view.
Figure 4C:
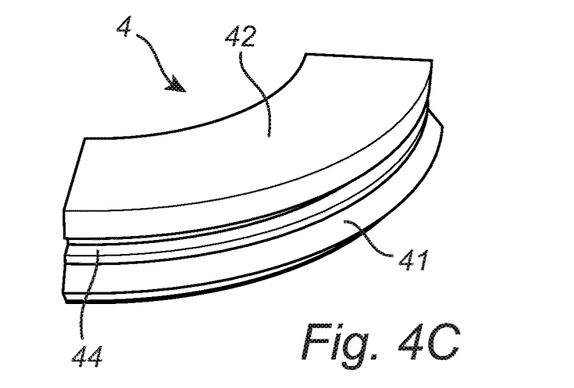
Figure 5A:
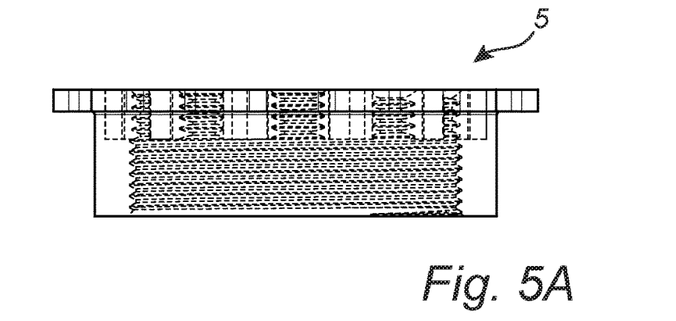
FIG. 5A is a cross sectional view and FIG. 5B is a top view.
Figure 5B:
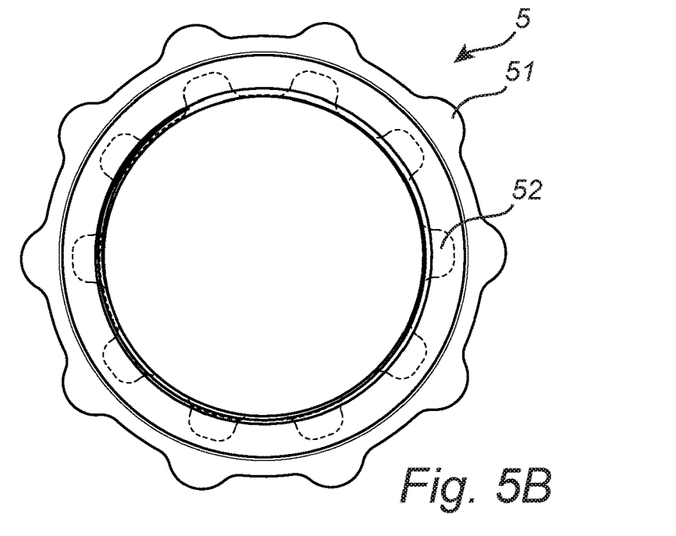
Figure 5C:
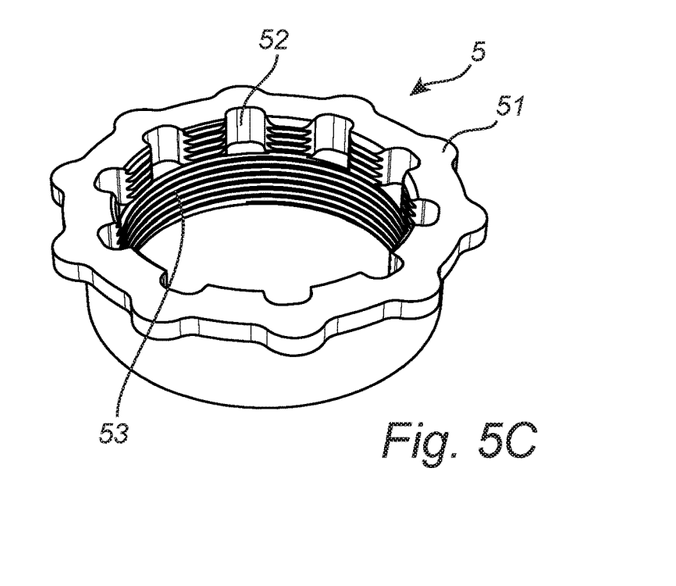
Figure 6:
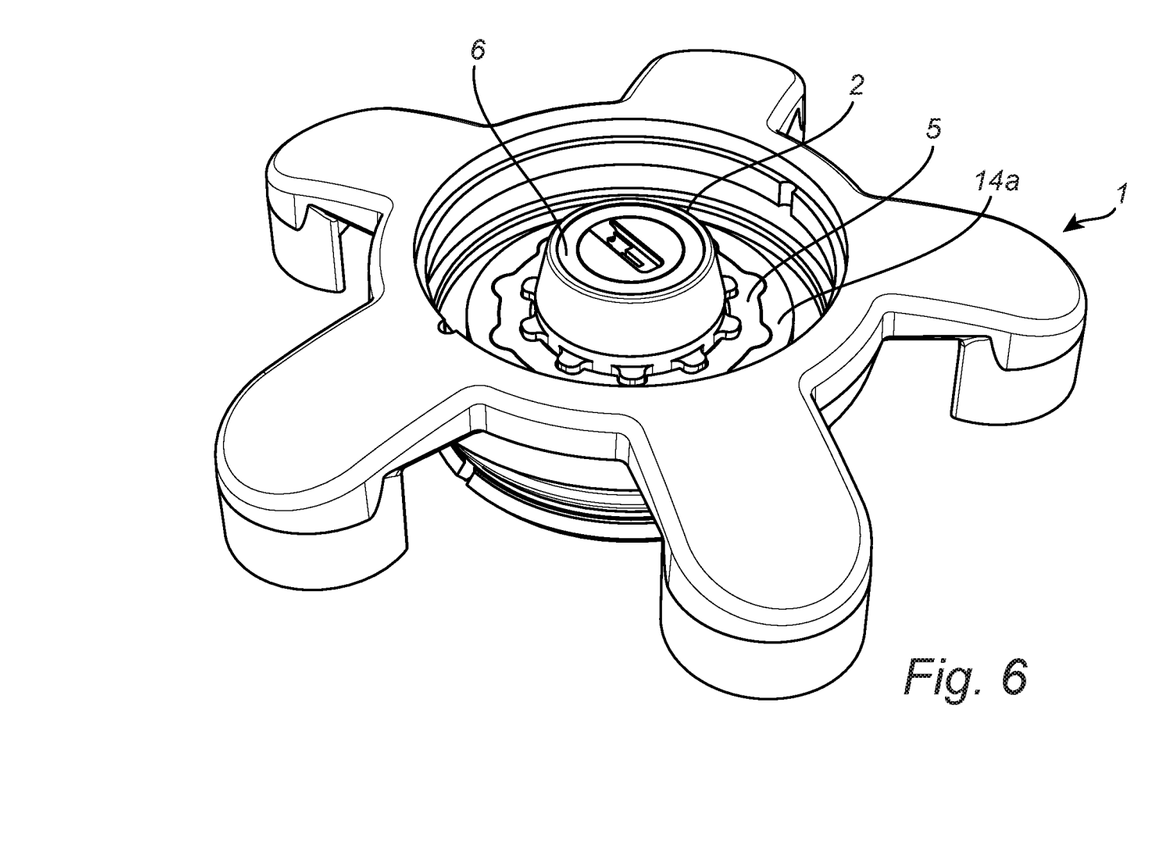
FIG. 6. is a perspective view of an embodiment of the device when mounted. The figure shows main module 1 and the socket of the main module 14*a*, the locking cap 2, the threaded socket 5, and a lock 6.
Figure 7:
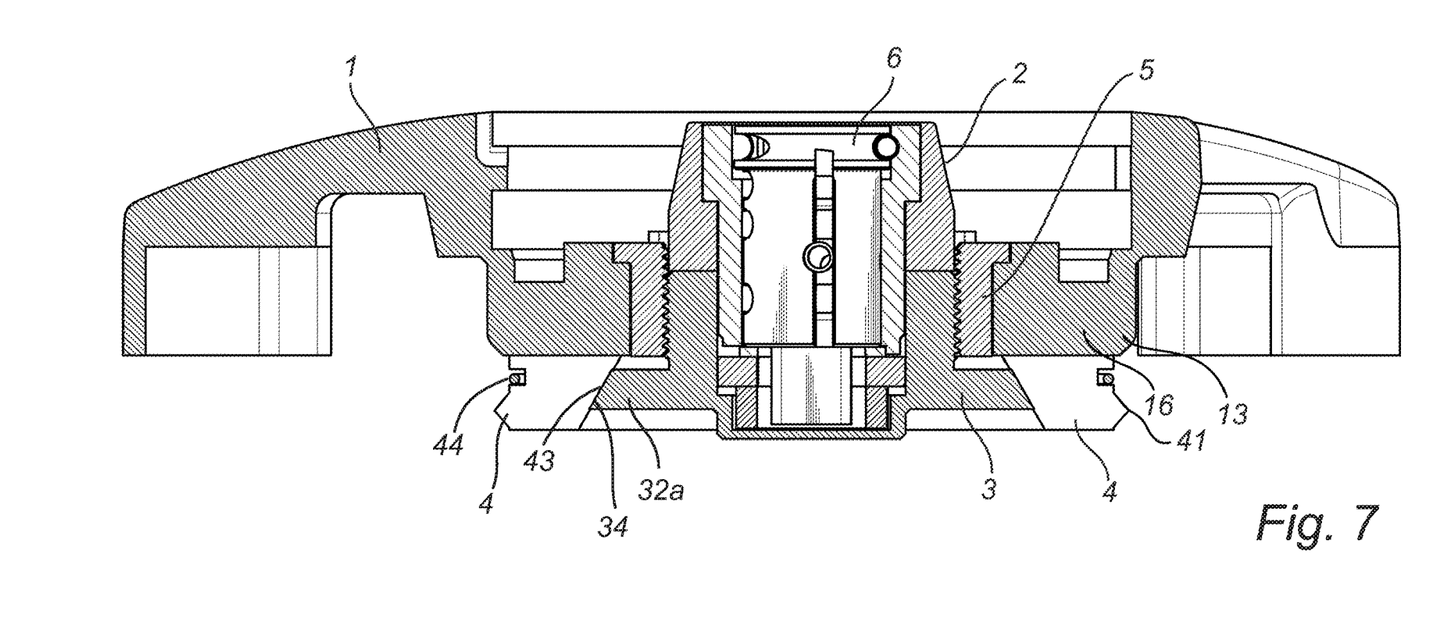
Figure 8:
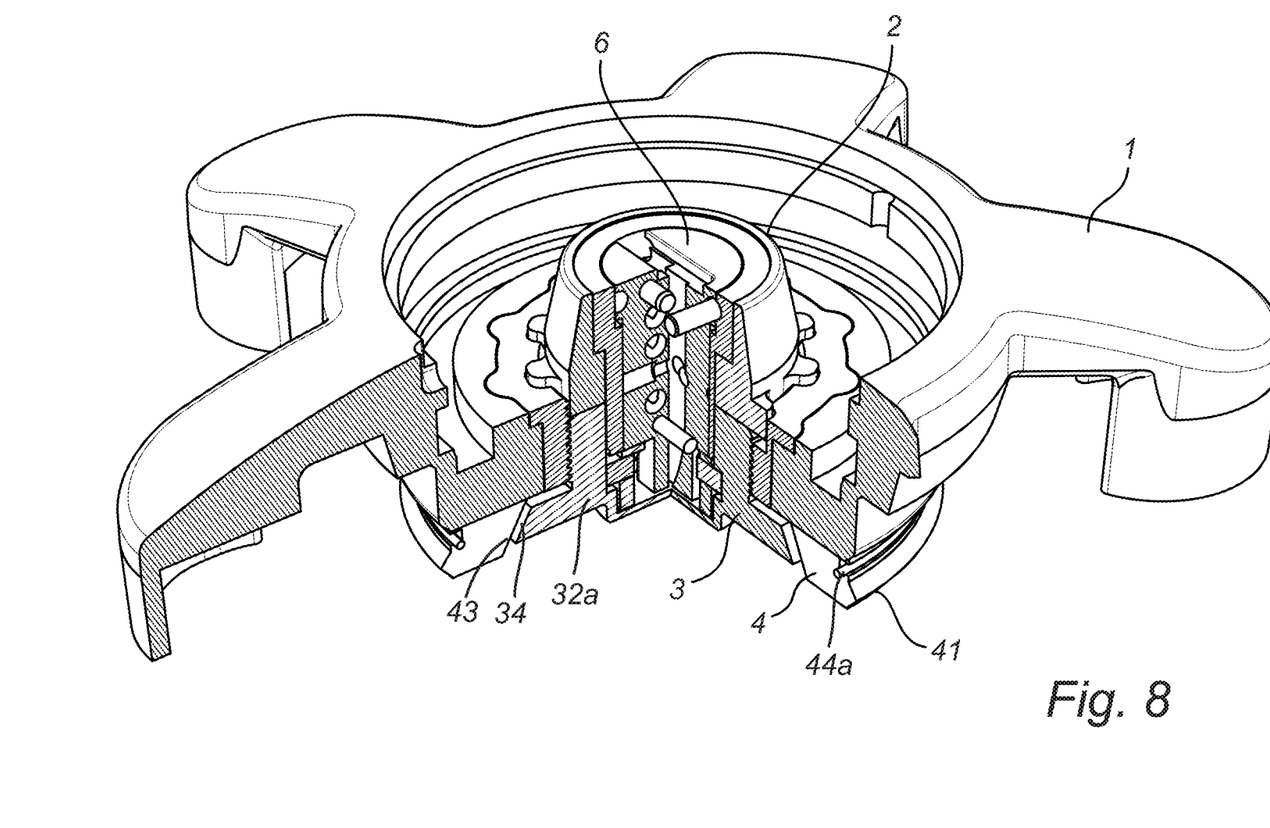

FIGS. 3A-C show an example of the center bolt 3, comprising a cylindrical part with threaded 32 outer surface that matches the threaded inner side 53 of the threaded socket 5. The center bolt 3 further comprises a hole or recess 31 for receiving a key or wrench for tightening the center bolt 3 in the main module 1, and to receive the locking mechanism fixating the center bolt 3 in its mounted position. As illustrated in the present figures, the center bolt 3 also comprises a tapered or cone shaped rim 34, against which the expander 4 may slide and expand in the radial direction as the center bolt 3 rotated and thus moved in the axial direction.

The expander 4 may be formed of a plurality of annular segments placed around the center bolt 3, such that the tapered surface 34 of the bolt and a corresponding surface 43 at the inner periphery of the expander slide on each other. An example of such an annular segment 4 is shown in FIGS. 4A-C and FIG. 7. The circular segments may be held together by means of a retaining means, such as e.g. a rubber band, squeezing the segments together to a circular shape. The retaining means may be arranged in a groove 44 running around the outer periphery of the annular segments. A skilled artisan realizes that other ways to keep the pieces together are as well possible. Such other ways could include for example a wire. According to one embodiment the expander is composed of four segments but choosing any number of segments is possible.

Alternatively, the expander 4 can be formed of an elastic material that expands in the radial direction upon compression in the axial direction (not shown in the present figures). Such a material may for example be rubber and may in some embodiments be provided in one circular piece. When the material of the expander is metal, the expander is preferably made of multiple segments to allow the required flexibility.

The assembled device, comprising the main module 1, the center bolt 3 and the expander 4, may be inserted into the rim. Additional modules, such as spacers, may be provided so as to adapt the device to the size and shape of the specific rim. In the present example, and the corner 13 on the bottom of the main module 1 illustrated in FIG. 1 may be the only contact point with the rim. In the mounted position illustrated in FIG. 8, the elements 12 are now covering the lug nuts on the rim.

To fasten the device to the wheel, a screw tool or key may be placed in the lock hole 31 of the center bolt (the tool preferably has the same shape as the lock). By turning the tool, the center bolt is screwed further outwards (the threaded outside 32 of the center bolt goes against the treaded inside 53 of the threaded socket). Then the surface 34 of the center bolt, which is in contact with the surface 44 of the expander 4, forces the expander(s) 4 to move outwards from the center. Simultaneously the surface 42 of the expander slides on the surface 16 of the main module 1. By expanding the expanders 4, the ridge 41 of the expander may be forced underneath the center of the wheel rim. If the design of the center of the rim has a ridge space or shoulder, the ridge 41 of the expander 4 may fasten the device axially behind the center of the rim.

When the module is fasted in the rim, the locking cap 2 may be placed in the threaded socket 5, fitting the pattern in 51 of the threaded socket 5 and the pattern 21 of the locking cap 2 together. Also, the hole 22 of the locking cap 2 and the hole 31 of the center bolt 3 should be aligned to enable the lock 6 to fit into the holes. The lock may be inserted to prevent any rotation in any direction between the center bolt 3 the threaded socket 5.

The head of the lock may rest in the space 23. The lock may be brought into a locking state, in which it may prevent the center bolt 3 from rotating and at the same time securely attached to the device. This may for example be achieved by means of a disc that is arranged by the end of the lock cylinder 6 and rotated to prevent it from passing through the hole 31 in the center bolt 3, or by means of locking pins or balls (not shown) arranged to be moved in the radial direction to engage with the center bolt 3. The locking pins or balls may be released when the lock is brought back to the open state, allowing it to be withdrawn from the center bolt 3.

Finally, a hub cap may be placed on top of the module. To provide locking devices fitting to various designs, the space 10 and the ridge come in different shapes and sizes.

The lock 6 could be for example AssaAbloy's cylinder lock in Desmo and Desmo+ series; but other locks may also be used. The lock may be operable by turning a key. In another embodiment the lock is operable electronically. It may be operated with a remote controller or via a smartphone.

It will however be appreciated that the above embodiments are merely examples illustrating the present inventive concept. Other illustrative embodiments are equally conceivable. A few of them will now be described in the following, with reference to FIGS. 9-11.

Figure 9:
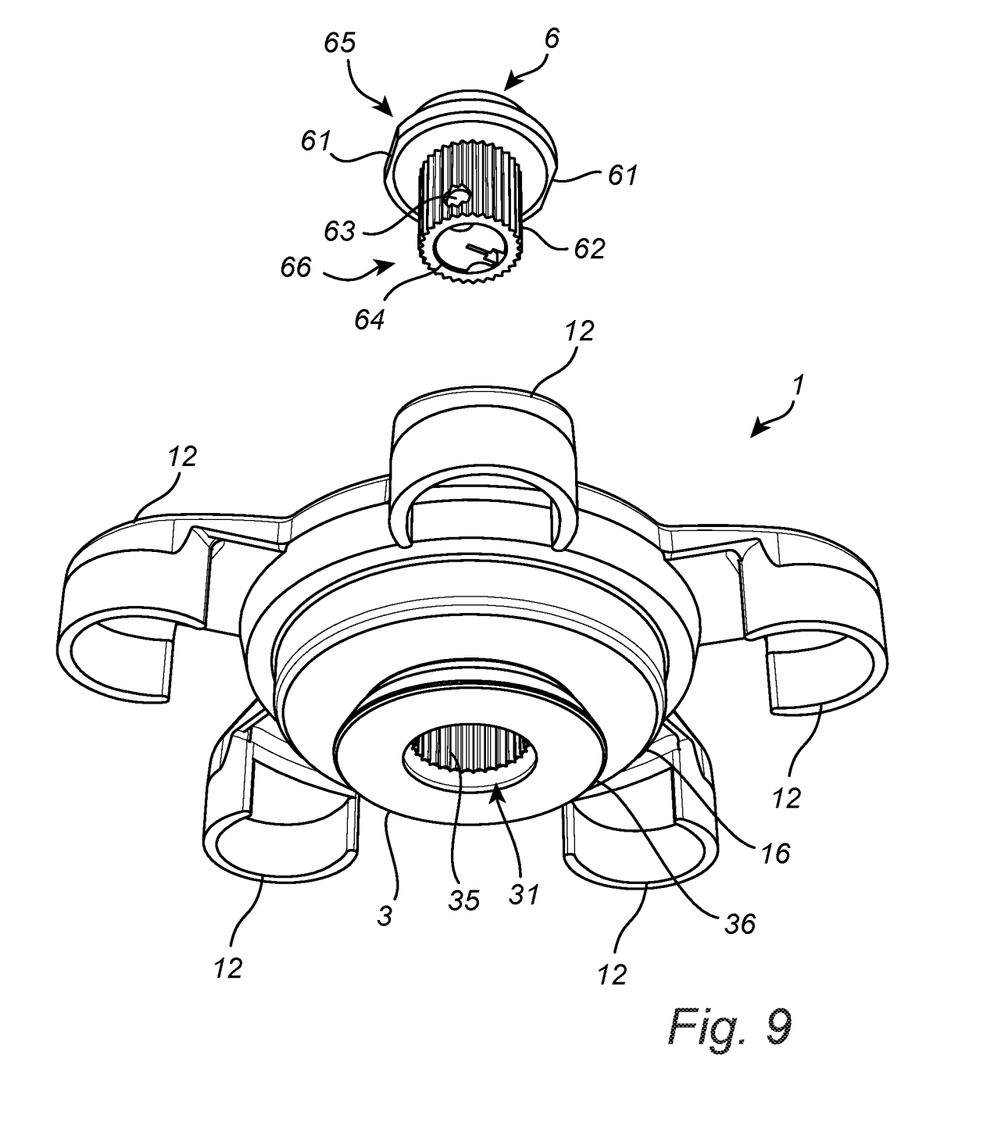
FIG. 9 is a perspective view of a device according to an embodiment, comprising a center bolt 3 and a locking mechanism 6 (not mounted) for fixating the center bolt 3 in the main module 1.

FIG. 9 is a perspective view of a device according to an embodiment, which may be similarly configured as the embodiments described with reference to FIGS. 1-8. The device may comprise a body forming a main module 1, or center part, and a plurality of cases or elements 12 for at least partly covering the nuts or bolts of the wheel. The body is configured to be arranged at the hub of the wheel, such that the axis of rotation of the wheel passes through a center of the main module and the bolt or nut cases 12 extend radially outwards from the axis of rotation.

The device may further comprise a center recess or hole, in which a center bolt 3 may be arranged in a manner that allows its axial position to be varied between a state in which the device is fixed of locked to the wheel and in a state in which the device can be removed from the wheel. The locking state may for example be achieved by allowing a rim or edge 36 of the center bolt 3 clamp the wheel or rim in the axial direction, or by allowing the center bolt 3 to radially expand an expander 4 such that it is press fitted against the wheel or rim in the radial direction as described above in connection with previous embodiments. In one example, the center bolt 3 may be threaded in the main module 1 (either directly or indirectly via a socket), such that the axial position of the bolt 3 can be adjusted by rotating the bolt 3 in the threading.

As illustrated in the present figure, the center bolt 3 may be provided with a recess or through hole 31 which may be configured to receive or accommodate a locking mechanism 6 for preventing further rotational movement of the center bolt 3 in relation to the main module 1. The recess or through hole 31 may be arranged in a center of the bolt 3 and may preferably be aligned with the axis of rotation of the wheel. Further, the inner wall of the recess or through hole 31 may be provided with a locking structure for engaging the locking mechanism 6 when it is inserted in the center bolt 3 such that the locking mechanism 6 is secured in the center bolt 3 in a manner that prevents the locking mechanism 6 from being rotated in the center bolt 3. This may for example be achieved by forming a plurality of recesses and protrusions 31 in the center bolt 3 and allowing them to engage a corresponding structure in the locking mechanism. In the present example of FIG. 9, ridges or teeth forming a spline structure 35, may be used for mating the locking mechanism 6 and the center bolt 6.

The locking mechanism 6 may comprise a first part 65 that can be mated with the main module 1 for maintaining the angular or rotational correspondence between the locking mechanism 6 and the main module 1. This may for example be realized by means of an outer circumference that is not rotationally symmetric, and which may be fitted in a corresponding structure in the main module 1. In the example illustrated in FIG. 9, the locking mechanism may be provided with a straight or flat edge 61 configured to engage with a similar edge in the main module 1 to achieve a rotational fixation in the main module 1. Further, the locking mechanism 6 may comprise a second part 66 that can be mated with the center bolt 6 as described above. In the present example, the second part 66 may comprise a spline structure 62 configured to mate with the spline structure 35 of the center bolt 3 to maintain the angular correspondence between the locking mechanism 6 and the center bolt 6 when the locking mechanism is inserted in the center bolt 6. In this way, the center bolt 3 may be rotationally fixed to the main module 1 through the torque transferred by the locking mechanism 6.

The locking mechanism 6 may further comprise an axial locking means for securing the locking mechanism 6 to the device in the locking state. The locking means may for example be formed of a pin or a ball that can be moved in the radial direction and engage with the center bolt 3 to prevent the locking mechanism 6 to be removed. In FIG. 9, an example is illustrated comprising a ball 63 that can be actuated by a lock cylinder 64 to fixate the locking mechanism in the center bolt 6.

Figure 10:
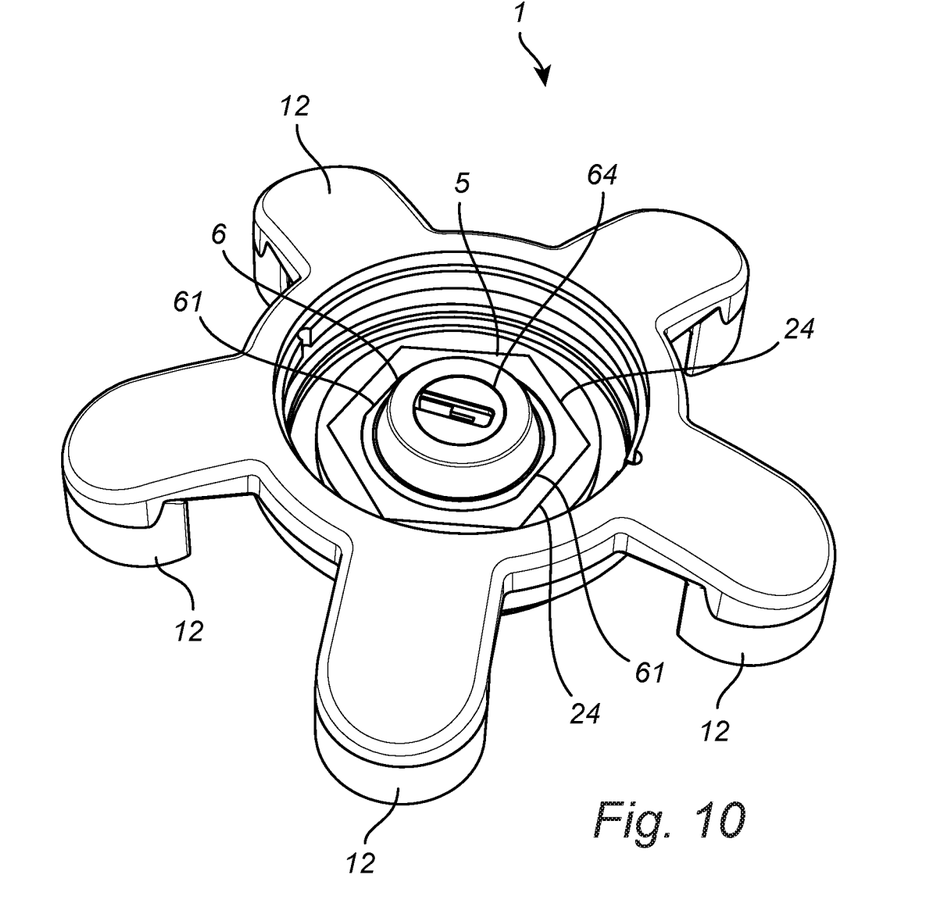
FIG. 10 is a perspective view of a device according to an embodiment, showing a locking mechanism 6 that is inserted in the center bolt 3 and attached to the main module 1 via a socket 5.

FIG. 10 is another perspective view of a device that may be similarly configured as the device shown in FIG. 9. In the current view, the locking mechanism has been inserted in the center bolt 6. FIG. 10 also indicates the position of the socket 2, which may be inserted in the recess or through hole of the main module 1 to strengthen the engagement between the center bolt 3 and the main module 1. The socket 2 may be rotationally or key fitted in the main module 1 by straight of flat edges 24 engaging a corresponding structure in the main module 1. Further, an inner circumference of the socket 2 may be provided with a straight or flat edge configured to engage a similar edge 61 of the first part 65 of the locking mechanism 6 for maintaining the angular or rotational correspondence between the locking mechanism 6 and the main module 1.

Figure 11:
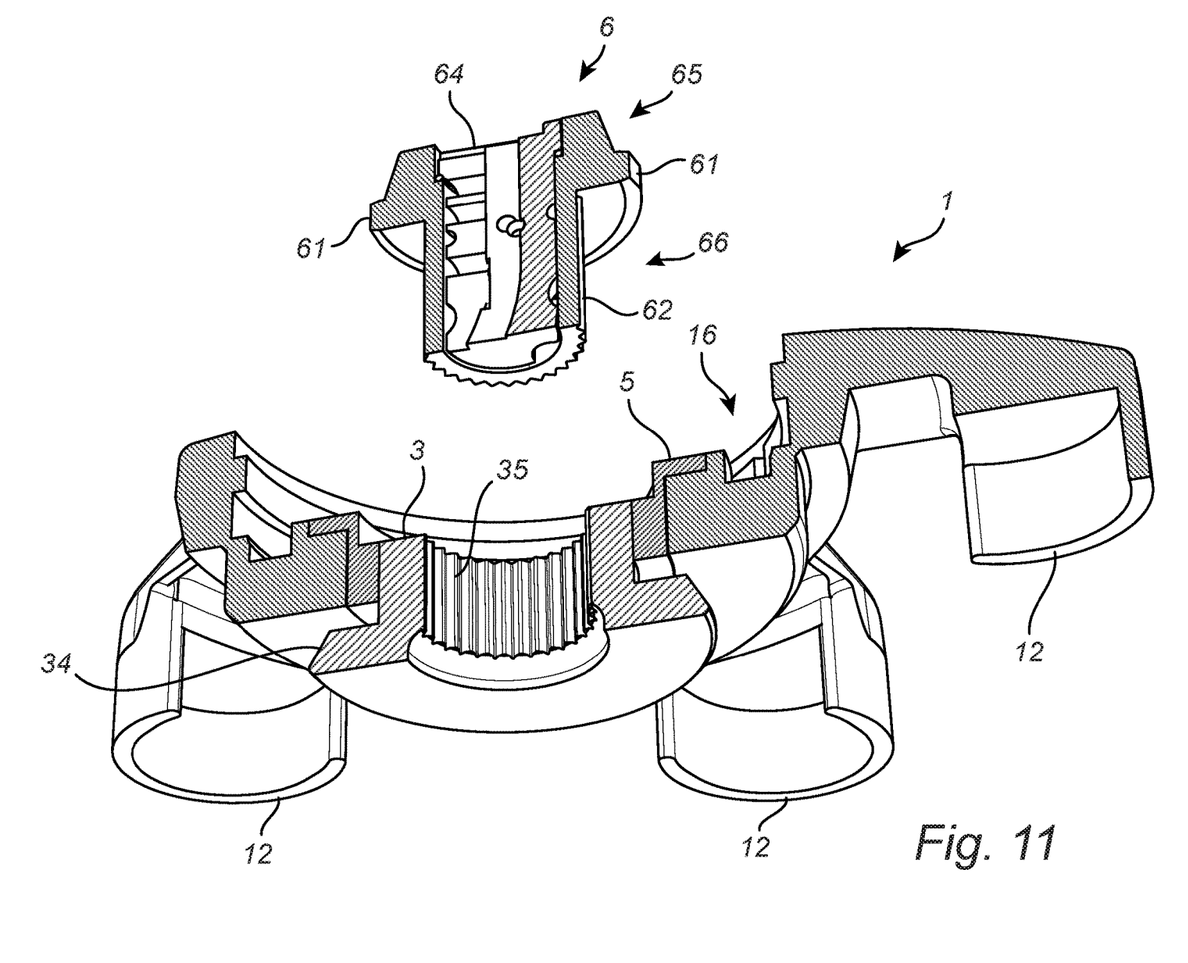
FIG. 11 is a cross sectional view of a device according to an embodiment, illustrating an example in which the locking mechanism 6 (not inserted) can be mated with the center bolt 3 by means of a spline structure.

FIG. 11 is a cross section of a device according to an embodiment, which may be similarly configured as the devices shown in FIGS. 9 and 10. In the present figure, an example arrangement of the threaded socket 5 is illustrated. The threaded socket 5 may be rotationally secured in main module as described above and comprising a thread into which the center bolt 3 may be screwed. The relative rotational movement between the center bolt 3 and the main module 1 may be prevented or hindered by inserting the locking mechanism 6, comprising a first part 66 having an edge or rim 61 for engaging the socket 2 (and thus the main module 1) and a second part 66 for engaging the center bolt 3.

The device may be manufactured from various types of materials; however, aluminum and steel are the preferred materials In the above the invention has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A device for locking a wheel of a vehicle, comprising:
a main module adapted to be attached to the wheel, the main module comprising a plurality of elements configured to cover nuts or bolts for attaching the wheel to the vehicle;
a center bolt comprising a lateral circular extension and the center bolt being adapted to be connected to the main module by means of a threading such that the axial position of the center bolt, as seen along the axis of rotation of the wheel, can be adjusted by rotating the center bolt relative the main module;
an annular expander formed of one or more segments, wherein each of the one or more segments has an inner surface and an outer surface, and the one or more segments are adapted to be arranged such that the inner and outer surfaces of the one or more segments form essentially continuous inner and outer circumferences of the annular expander,
the annular expander being adapted to be operably connected to the lateral extension of the center bolt via the inner circumference of the annular expander such that the annular expander expands in a radial direction of the wheel as the axial position of the center bolt is adjusted, such that the outer circumference of the annular expander engages with the wheel and thereby secures the device to said wheel; and
a locking mechanism adapted to be arranged in a locking state in which the locking mechanism prevents the center bolt from rotating relative the main module, and in an open state in which the locking mechanism allows the center bolt to rotate relative the main module.

2. The device according to claim 1, wherein the expander comprises a plurality of segments, and wherein each of the segments is movable in the radial direction so as to engage the device to the wheel.

3. The device according to claim 2, wherein:
the lateral circular extension of the center bold has a sloped edge, and
each of the segments of the expander comprises a sloped surface portion configured to slide against the sloped edge of the circular extension as the center bolt moves in the axial direction, thereby causing each segment to move in the radial direction.

4. The device according to claim 2, wherein the expander further comprises a retaining means configured to pull the segments towards a center of the expander.

5. The device according to claim 1, wherein the expander comprises a material configured to be compressed elastically in the axial direction and to expand elastically in the radial direction as the axial position of the center bolt is adjusted.

6. The device according to claim 1, wherein the expander is configured to secure the device by exerting a force on the wheel in the radial direction.

7. The device according to claim 1, wherein the expander is configured to secure the device by engaging a shoulder of the wheel, thereby exerting a force on the wheel in the axial direction.

8. The device according to claim 1, wherein the locking mechanism comprises:
an axial recess formed in the center bolt;
a detachable socket having a through hole and being adapted to be rotationally secured to the main module; and
a detachable locking bolt adapted to be inserted into the main module via the through hole and the axial recess;
wherein:
the axial recess and the through hole are configured to be aligned with each other; and
the locking bolt is adapted to prevent the center bolt from rotating relative to the detachable socket.

9. The device according to claim 8, wherein the detachable socket comprises recesses and protrusions configured to engage with corresponding recesses and protrusions of the main module.

10. The device according to claim 8, further comprising a locking socket adapted to be rotationally secured to the main module, the locking socket comprising a through hole adapted to receive the locking bolt, and recesses and protrusions configured to engage with corresponding recesses and protrusions of the detachable socket.

11. The device according to claim 8, wherein the locking bolt comprises a key hole and is operable by turning a key in the lock.

12. The device according to claim 8, wherein the locking bolt is configured to be inserted via a front side of the device and secured in the axial direction by engaging a back side of the device.

* * * * *